No. 670,725. Patented Mar. 26, 1901.
E. F. PICKETT.
VALVE FOR INFLATING BODIES.
(No Model.)
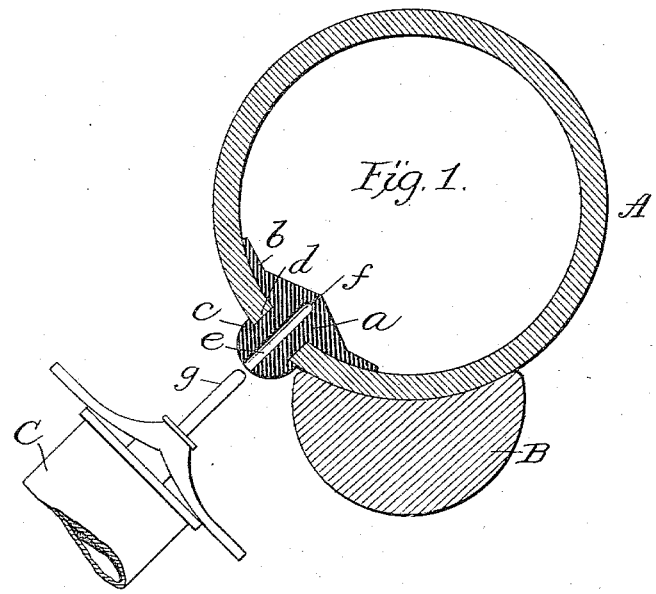
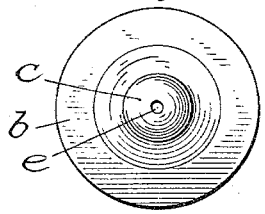 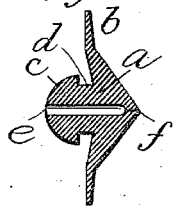 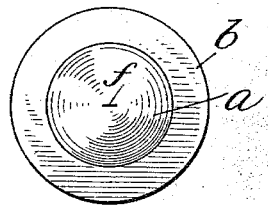
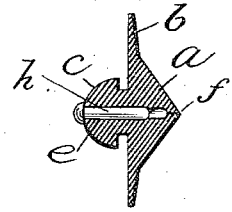 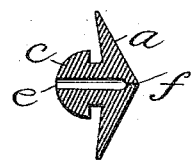
Attest
Walter Donaldson
L. B. Middleton
Inventor
EDWARD F. PICKETT
by F. L. Middleton
Atty

UNITED STATES PATENT OFFICE.

EDWARD F. PICKETT, OF BUFFALO, NEW YORK, ASSIGNOR OF TWO-THIRDS TO W. H. GRATWICK AND PENDENNIS WHITE, OF SAME PLACE.

VALVE FOR INFLATING BODIES.

SPECIFICATION forming part of Letters Patent No. 670,725, dated March 26, 1901.

Application filed December 13, 1900. Serial No. 39,677. (No model.)

*To all whom it may concern:*

Be it known that I, EDWARD F. PICKETT, a citizen of the United States, residing at Buffalo, State of New York, have invented certain new and useful Improvements in Valves for Inflating Bodies, of which the following is a specification.

I have aimed in the present invention to provide a valve adapted for use in connection with inflatable bodies—such as tires for vehicles, bicycles, and the like—of very simple construction and capable of being readily applied and without necessitating the use of any metal parts, such as is customary in the valves which require metal casings and which ordinarily pass through the rim of the wheel.

One of the objects of my invention is to avoid such a construction as this, as it is the occasion for such frequent injury to the tire whenever the tire creeps upon the rim, and to this end my improved valve is so constructed as to be wholly of rubber and adapted for application to the tire to one side of the rim, so that the creeping of the tire will have no effect to cause a rupture of the parts. The construction of my valve is such, also, that it may be applied very much as an ordinary repair-plug is applied, and thus but little additional knowledge is required to properly supply a tire with my valve.

I have illustrated the invention in detail in the accompanying drawings, in which, in—

Figure 1, I have shown simply the outline of a tire and rim with my valve indicated as in place and with a part of the pump adjacent to the opening in the valve ready to inflate or deflate the tire. Fig. 2 is a detached view of the valve in plan. Fig. 3 is a central sectional view of the valve. Fig. 4 is a bottom view of the valve detached. Fig. 5 is a section of a modification. Fig. 6 shows a further modification in section. Fig. 7 illustrates the pin adapted to close the cavity in the valve and to protect it from dirt. Fig. 8 is a modification of this pin.

The tire in Fig. 1 may be representative of any form of tire and, indeed, of any inflatable body, as I do not limit myself in the application of the invention to tires only, as it may be applied to any body where it is desirable to have a simple form of valve free from metal parts, through which air may be introduced to inflate the body or the air may be discharged to deflate the same.

A indicates the tire, and B the rim. My valve does not require to be passed through the rim, as in common forms of valves having metal stems, but is intended for use to one side of the rim, and being composed of rubber does not in any way interfere with the free running of the tire and presents no obstruction sufficient to catch in anything or to cause injury either to the tire or the valve. The valve is of very simple construction, as shown in Figs. 2, 3, and 4. It consists of a body $a$, adapted to be contained within the tire, provided with a flange $b$, which is cemented securely to the inner face of the tire by the insertion of cement in precisely the same manner as a repair-plug is cemented in, an outer head $c$, larger than the opening for the tire, so as to overlap the same and prevent the displacement of the valve, and a connecting neck portion $d$ between the body $a$ and the head $c$. This neck portion is shorter than the wall of the tire in order to draw the head $c$ and the body $a$ firmly against opposite sides of the said tire-wall. In practice the tension of the neck will be sufficient to hold the outer head against the tire and render cementing at this point unnecessary; but this may be done if found desirable. The neck when fitted to the opening in the tire will be in tension, and this tension will act to increase the pressure at the apex of the body. A central passage $e$ is formed through the head and neck and a part of the body; but this passage does not extend entirely through it of the same diameter, but from its termination a slit is formed, as at $f$, to provide for the passage of the air to or from the tire. Instead of the slightly-elongated slit shown there may be a simple perforation.

The pump shown at C is provided with a nipple $g$, preferably of a diameter slightly in excess of the diameter of the passage $e$, so that as the nipple is forced into the passage there will be frictional contact therewith throughout its extent, thus preventing any leakage around the nipple. After it is inserted in the passage the pump is operated and the air will pass through the opening in the end of the nipple and force its way through the slit or perforation $f$ of the valve to the interior of the tire. When it is desired to deflate the tire, the nipple $g$ of the pump will be forced in far enough to distend the slit or perforation $f$, and thus allow the air to escape through the pump.

While it may be sufficient to depend upon the compression of the material of the body $a$ in the form shown in Fig. 5 to keep the slit or perforation closed, and thus prevent the escape of air, I prefer to supplement or add to this pressure by making the body directly beneath the head dished or concave, as shown in Fig. 3. It will be seen that when the valve is securely cemented to the inner face of the tire this dished or concave face under the tension of the elastic neck will flatten out and follow the contour of the inner face of the tire, and the result will be to throw an increased pressure upon the apex of the body $a$ at the point where the slit or perforation occurs, and thus prevent all danger of leakage.

In Fig. 5 I have shown a slightly-modified form of the valve of Fig. 3, the concavity being absent in this form and the face of the valve being perfectly flat. When applied to the tire, however, the tension of the neck, together with the curved inner wall of the tire, will bend the body of the valve, as shown in Fig. 1, and have the same effect, though in a less degree.

In both Figs. 3 and 4 I have shown the valve with a flange $b$ flat on the under side in order that it may hug the tire more closely while being connected. It may be found sufficient to omit this flange in some instances, with the dishing extending to the edge of the valve, and I have shown such a valve in Fig. 6. This is substantially the valve of Fig. 3, with the flange $b$ omitted. The position of the valve relatively to the tire and wheel-rim is such as to protect it; but in order to absolutely prevent dust or dirt from filling up the passage $e$ I prefer to use a dust-pin $h$, as shown in Fig. 7. This is simply a headed pin adapted to be inserted in the passage $e$ and to fit its walls very closely, so that the frictional contact will hold it in place. The pin when closing the passage will also be an additional safeguard against the escape of air from the tire. It may be readily removed when it is desired to inflate or deflate the tire.

In Fig. 8 I have shown a modification of this pin, the inner end being rounded and slightly bulging, so as to increase the frictional contact with the walls of the opening $e$.

What I claim is—

1. A valve for tires and the like comprising an outer head, a body portion, a neck adapted to draw the said head and body portion against opposite sides of said tire-wall, a central bore with a contracted opening in the apex of said body, said apex adapted to be pressed together, substantially as described.

2. A valve for inflatable bodies, comprising a body portion with a central opening through the same, means for pressing the parts of the opening closely together to prevent leakage, said body portion being adapted to be secured to the inner wall of the tire, a head and a neck integral with the body portion and a central passage adapted to receive the nipple of the pump, the neck being adapted to draw the head and body against opposite sides of the tire-wall, substantially as described.

3. A valve for inflatable bodies composed of elastic material, a central passage for the insertion of the pump-nipple, and a dust-pin fitted to said opening, substantially as described.

4. A valve for inflatable bodies composed of a body portion, an outer head, a connecting-neck, all being elastic and integrally formed, a central bore in said valve, and a dust-pin adapted to be fitted to said bore, substantially as described.

In testimony whereof I affix my signature in presence of two witnesses.

EDWARD F. PICKETT.

Witnesses:
 HENRY E. COOPER,
 L. B. MIDDLETON.